United States Patent
Chalermboon et al.

(10) Patent No.: US 8,934,273 B2
(45) Date of Patent: Jan. 13, 2015

(54) SWITCHING POWER SUPPLY INCLUDING POWER FACTOR CORRECTION CIRCUIT WITH POLARITY DETERMINATION CONTROL

(75) Inventors: Nadthawut Chalermboon, Nagano (JP); Yoshihiro Nakamura, Nagano (JP)

(73) Assignee: Minebea Co., Ltd., Nagano (JP)

( * ) Notice: Subject to any disclaimer, the term of this patent is extended or adjusted under 35 U.S.C. 154(b) by 226 days.

(21) Appl. No.: 13/605,479

(22) Filed: Sep. 6, 2012

(65) Prior Publication Data

US 2013/0077365 A1    Mar. 28, 2013

(30) Foreign Application Priority Data

Sep. 27, 2011    (JP) .................................. 2011-210549

(51) Int. Cl.
*H02M 5/42* (2006.01)
*H02M 1/42* (2007.01)
*H02M 7/5388* (2007.01)

(52) U.S. Cl.
CPC .......... *H02M 1/4208* (2013.01); *H02M 1/4233* (2013.01); *H02M 7/5388* (2013.01); *Y02B 70/126* (2013.01)
USPC ............................................ 363/89; 323/207

(58) Field of Classification Search
USPC .......... 363/44, 81, 84, 89, 125, 127; 323/205, 323/207
See application file for complete search history.

(56) References Cited

U.S. PATENT DOCUMENTS

| | | | |
|---|---|---|---|
| 8,526,201 B2 * | 9/2013 | Minami et al. ................... | 363/17 |
| 8,717,791 B2 * | 5/2014 | Wildash .......................... | 363/89 |
| 2012/0014149 A1 * | 1/2012 | Usami ............................. | 363/84 |
| 2012/0092911 A1 * | 4/2012 | Usami ............................. | 363/89 |
| 2013/0308358 A1 * | 11/2013 | Usami ............................. | 363/84 |

FOREIGN PATENT DOCUMENTS

| | | |
|---|---|---|
| JP | 2001-045763 A1 | 2/2001 |
| JP | 2001-238452 A1 | 8/2001 |

OTHER PUBLICATIONS

Liu Xuechao, Wang Zhihao, UCC28070 Implement Bridgeless Power Factor Correction (PFC) Pre-Regulator Design, Application report (Texas Instruments), Jul. 2009, pp. 1-12, SLUA517, Texas Instruments, Dallas, TX.

* cited by examiner

*Primary Examiner* — Gary L. Laxton
*Assistant Examiner* — Alex Torres-Rivera

(57) ABSTRACT

The present invention relates to a PFC switching power supply which can perform polarity determination and voltage detection of AC voltage without using a DC isolator such as a transformer.
Included are: a power factor correction section which rectifies AC voltage inputted, outputs DC voltage to a load and corrects a power factor; an input voltage detecting section which outputs L pole detected voltage and N pole detected voltage; and a switching controller which controls the operation of the power factor correction section. An AC waveform generating section of the switching controller generates an AC waveform. The switching controller generates a drive pulse having a frequency and a duty ratio varying depending on AC waveform, whereby a predetermined level of the DC output of the power factor correction section is maintained and in addition, the power factor is corrected.

5 Claims, 15 Drawing Sheets

SWITCHING POWER SUPPLY INCLUDING POWER FACTOR CORRECTION CIRCUIT WITH POLARITY DETERMINATION CONTROL

BACKGROUND OF THE INVENTION

1. Field of the Invention

The present invention relates to a switching power supply having power factor correction.

2. Description of the Related Art

In switching power supplies, correction of a power factor requires suppression of generation of harmonics of AC input current and reduction of phase difference between AC input current and AC input voltage. As this kind of switching power supply, there has hitherto been developed one in which AC voltage is switched by a pulse width modulated (PWM) drive signal (refer to Japanese Patent Laid-Open Nos. 2001-238452 and 2001-045763, and Liu XueChao and Wang ZhiHao, "UCC28070 Implement Bridgeless Power Factor Correction Pre-Regulator Design" Texas Instruments Application Report JAJA214 http://focus.tij.co.jp/jp/lit/an/jaja214/jaja214.pdf).

In a switching power supply having power factor correction (PFC switching power supply), for example, positive half cycle and negative half cycle of AC voltage are each properly switched by use of a switching device driven by a PWN drive signal having a frequency substantially higher than AC power line frequency, whereby a desired DC voltage is provided and in addition, generation of harmonics in AC input is suppressed and the phase difference between AC input current and AC input voltage is reduced to correct the power factor. In this case, "positive half cycle of AC voltage" means half cycle in which the L pole (Live pole) side has positive voltage relative to N pole (Neutral pole) of AC voltage; and "negative half cycle of AC voltage" means half cycle in which the L pole (Live pole) side has negative voltage relative to N pole (Neutral pole) of AC voltage.

As a configuration of bridgeless power factor correction circuit, for example, six types illustrated in FIGS. 15(A) to 15(F) are known (in the circuits of FIG. 15, the capacitors are each a smoothing capacitor, and the circuit section contributing to power factor correction is constituted of coils, switching devices and rectifying devices and others).

The aforementioned PFC switching power supplies have a function of driving the switching devices of the power factor correction section based on results of determining whether it is in positive or negative half cycle of AC voltage (in this case, the circuits illustrated in FIG. 15 each correspond to a booster convertor, and the section for determination on positive or negative half cycle is not illustrated).

However, a circuit element lies between N and L poles of AC voltage and reference potential of the power factor correction section (typically, ground potential of the power factor correction section, that is, reference potential on the side of DC output); consequently, a difference of voltage lies therebetween. In determining the polarity of AC voltage, this difference of voltage is an undesirable factor. Thus, in order to remove effects of this difference of voltage, a circuit element (DC isolator), such as a transformer or photo coupler, is used to perform DC isolation between N and L poles of AC voltage and reference potential point of the power factor correction section (Japanese Patent Laid-Open Nos. 2001-238452 and 2001-045763).

However, when the element for performing DC isolation between the AC input side and the DC output side is used, the size of the circuit for determination of polarity of AC voltage is enlarged. Further, the use of a transformer, hardly downsized, causes problems of size and weight growth of the PFC switching power supply, resulting in increased cost, as the AC power line frequencies are low (for example, 50 Hz or 60 Hz). Furthermore, when different AC voltages or different AC power line frequencies are handled, it is also needed to provide plural sorts of transformers different in specifications design.

In implementing the power factor correction section having various circuit configurations, different sorts of hardware are needed for each circuit configuration, thus causing problems of increasing development/design cost and manufacturing cost and also increasing the number of components used in maintenance.

In order to address the above problems, an object of the present invention is to implement a PFC switching power supply which can determine the polarity of AC voltage and detect the voltage thereof without using a DC isolator such as a transformer or photo coupler and preferably in which hardware related to determination of polarity of AC voltage can be used in a shared manner.

SUMMARY OF THE INVENTION

In order to address the above problems, a switching power supply (hereinafter, a PFC switching power supply may be simply referred to as a switching power supply) according to the present invention includes: an input section connected to an AC power line; a power factor correction section which performs switching of AC voltage inputted to the input section, based on the cycle (for example, positive half cycle or negative half cycle) of the AC voltage and thereby rectifies the AC voltage, and outputs DC voltage to a load and in addition, corrects the power factor; an input voltage detecting section which outputs L pole detected voltage corresponding to L pole voltage of the input section and N pole detected voltage corresponding to N pole voltage of the input section; and a switching controller which controls, based on the L pole detected voltage and the N pole detected voltage, the operation of the power factor correction section.

In this case, input terminals of L pole and N pole of the input section are in a state electrically floating relative to a reference point (typically, the ground of the power factor correction section) of the power factor correction section. Accordingly, L pole detected voltage corresponding to waveform of voltage between the L pole of the input section and the reference point of the power factor correction section includes a DC offset component (an AC voltage component may also be included depending on the circuit configuration of the power factor correction section); similarly, N pole detected voltage corresponding to waveform of voltage between the N pole of the input section and the reference point of the power factor correction section includes a DC offset component.

Thus, an AC waveform generating section included in the switching controller outputs, based on the L pole detected voltage and the N pole detected voltage, AC waveform data.

The switching controller generates, based on the AC waveform data, a drive pulse having a frequency (higher than audio frequency range, for example, a frequency from 20 kHz to several hundred kHz) substantially higher than AC voltage frequency, and having a duty ratio varying depending on the AC waveform data, and uses the drive pulse to drive one or more switching devices included in the power factor correction section.

In this way, the switching power supply maintains a predetermined level of the DC output of the power factor correction section and in addition, corrects the power factor (claims 1 and 6).

The AC waveform generating section, for example, compares the amplitude of the L pole detected voltage with that of the N pole detected voltage and determines, based on the comparison result, positive half cycle and negative half cycle of the AC voltage, and then generates, according to the determined half cycle, a voltage waveform from the L pole detected voltage and the N pole detected voltage, and outputs as AC waveform data, an AC waveform generated based the voltage waveform (claims 2 and 6).

The voltage waveform generation is performed as described below, for example. That is, as a result of comparing the amplitudes of the L pole detected voltage and the N pole detected voltage, when the L pole detected voltage is greater than the N pole detected voltage, the cycle of the AC voltage is determined to be one of positive half cycle and negative half cycle (for example, positive half cycle), and then a first voltage waveform is generated which corresponds to a waveform being the result of subtracting a voltage obtained by multiplying the N pole, detected voltage in the one half cycle by a predetermined second coefficient from a voltage, and the L pole, detected voltage in the one half cycle by a determined first coefficient. The first voltage waveform thus generated corresponds to voltage waveform of the one half cycle of the AC voltage.

When the N pole detected voltage is greater than the L pole detected voltage, the cycle of the AC voltage is determined to be the other of positive half cycle and negative half cycle (for example, negative half cycle), and then a second voltage waveform is generated which corresponds to a waveform being the result of subtracting a voltage obtained by multiplying the N pole, detected voltage in the other half cycle by the predetermined second coefficient from a voltage, and the L pole, detected voltage in the other half cycle by the determined first coefficient. The second voltage waveform thus generated corresponds to voltage waveform of the other half cycle of the AC voltage. The voltage waveform (AC waveform) is generated based on the first voltage waveform and the second voltage waveform (claims 3 and 7).

When the N pole detected voltage is greater than the L pole detected voltage (that is, in the case of the other half cycle), another method of generating the second voltage waveform will be described below. That is, an inverted second voltage waveform is generated which corresponds to a waveform being the result of subtracting a voltage obtained by multiplying the L pole, detected voltage in the other half cycle by the predetermined first coefficient from a voltage, and the N pole, detected voltage in the other half cycle by the predetermined second coefficient. The inverted second voltage waveform thus generated corresponds to voltage waveform obtained by inverting the AC voltage waveform in the other half cycle. Consequently, a pulsating-current voltage waveform (for example, pulsating-current waveform of positive polarity) is generated based on the first voltage waveform and the inverted second voltage waveform. Alternatively, when the similar processing is performed with respect to the one half cycle, a pulsating-current voltage waveform (for example, pulsating-current waveform of negative polarity) is generated based on an inverted first voltage waveform and the second voltage waveform (claims 5 and 7).

When the PFC switching power supply and the AC waveform generating method for the PFC switching power supply according to the present invention are used, polarity determination and voltage detection of AC voltage can be done without using a DC isolator such as a transformer or photo coupler and further, hardware related to the polarity determination of AC voltage can be used in a shared manner.

DETAILED DESCRIPTION OF THE PREFERRED EMBODIMENTS

A switching power supply according to the present invention, having power factor correction, and an AC waveform generating method for power factor correction will be described below with reference to the drawings.

Embodiment 1

Figure 1:
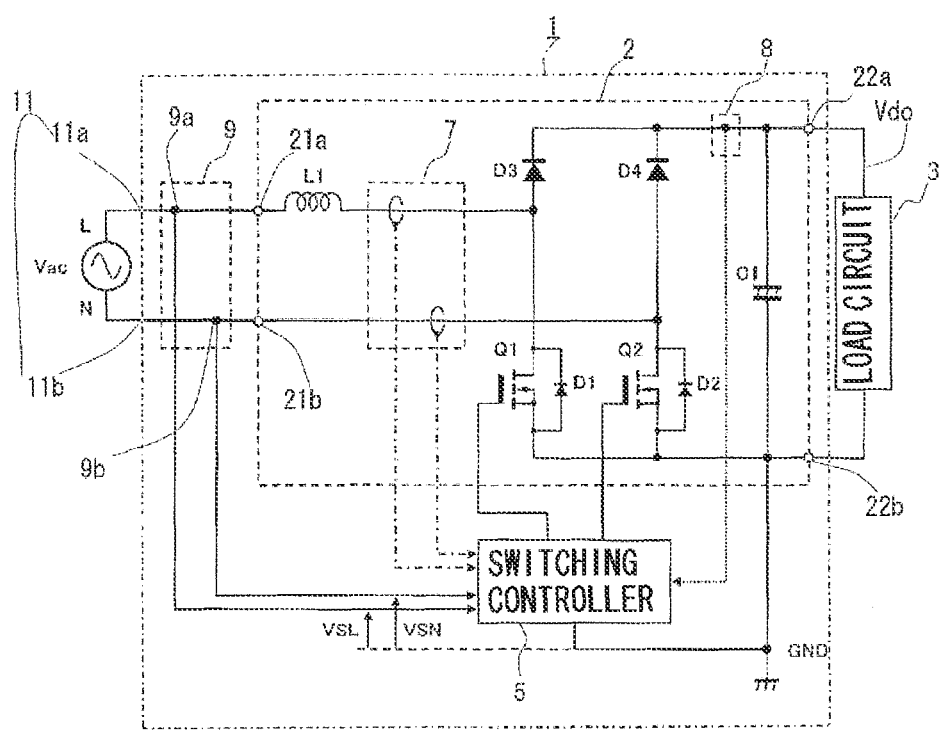
FIG. 1 is a view illustrating a substantial circuit configuration in an embodiment of a switching power supply according to the present invention.

FIG. 1 illustrates a substantial circuit configuration in an embodiment of a switching power supply according to the present invention, having power factor correction.

The switching power supply according to the present invention is characterized by AC waveform generation for determining positive half cycle and negative half cycle of AC voltage. In order to explain this characteristic, first, the configuration of the switching power supply and an outline of the operation of a power factor correction section will be described and then the AC waveform generation will be described.

<Configuration of Switching Power Supply>

The switching power supply 1 illustrated in FIG. 1 receives AC power and supplies DC power to a load 3. As the load 3, there are various types of electrical devices or power devices; the electrical devices may include a DC/DC converter. The switching power supply 1 includes an input section 11, a power factor correction section 2, a smoothing capacitor C1, a switching controller 5, a reactor current detecting section 7, an output voltage detecting section 8 and an input voltage detecting section 9.

An AC L pole input terminal 11a (connected to an L pole input terminal 21a of the power factor correction section 2) of the input section 11 is connected, for example, to L pole (Live voltage side) of AC voltage Vac. An AC N pole input terminal 11b (connected to an N pole input terminal 21b of the power factor correction section 2) of the input section 11 is connected, for example, to N pole (Neutral voltage side) of AC voltage Vac.

The power factor correction section 2 includes a first switching device Q1, a second switching device Q2, a third diode D3, a forth diode D4, and a first inductor L1 used for boost-up operation (hereinafter, an example in which N channel MOS-FET is used as the switching device will be described; when P channel MOS-FET is used, additional information will be given). In FIG. 1, the first switching device Q1 and the third diode D3 are connected in series, and the second switching device Q2 and the forth diode D4 are connected in series (in both the series circuits, the drain of the FET is connected to the anode of the diode).

The respective cathodes of the third diode D3 and the forth diode D4 are connected to a L pole output terminal 22a of the power factor correction section 2, and the respective sources of the first switching device Q1 and the second switching device Q2 are connected to a N pole output terminal 22b of the power factor correction section 2. A smoothing capacitor C1 is connected in parallel between the L pole output terminal 22a and the N pole output terminal 22b.

The L pole input terminal 21a is connected via the first inductor L1 to a connecting point of the first switching device Q1 and the third diode D3. The N pole input terminal 21b is connected to a connecting point of the second switching device Q2 and the forth diode D4. The switching devices, the diodes and the first inductor L1 constitutes a boost-up converter. The reactor current detecting section 7 detects current flowing to the L pole input terminal 21a and current flowing out from the N pole input terminal 21b.

One terminal 9a of the input voltage detecting section 9, connected to the L pole input terminal 21a, detects L pole detected voltage VSL; the other terminal 9b of the input voltage detecting section 9, connected to the N pole input terminal 21b, detects N pole detected voltage VSN (the L pole detected voltage VSL and the N pole detected voltage VSN are both a voltage relative to the ground GND of the switching power supply 1).

A first diode D1 and a second diode D2 are parasitic diodes of the first switching device Q1 and the second switching device Q2, respectively. These parasitic diodes work as a diode when the switching devices (FETs) are in the off state (instead of using the parasitic diode, a diode may be connected in parallel between the source and drain of the FET).

<Outline of Operation of Power Factor Correction Section>

Figure 2:
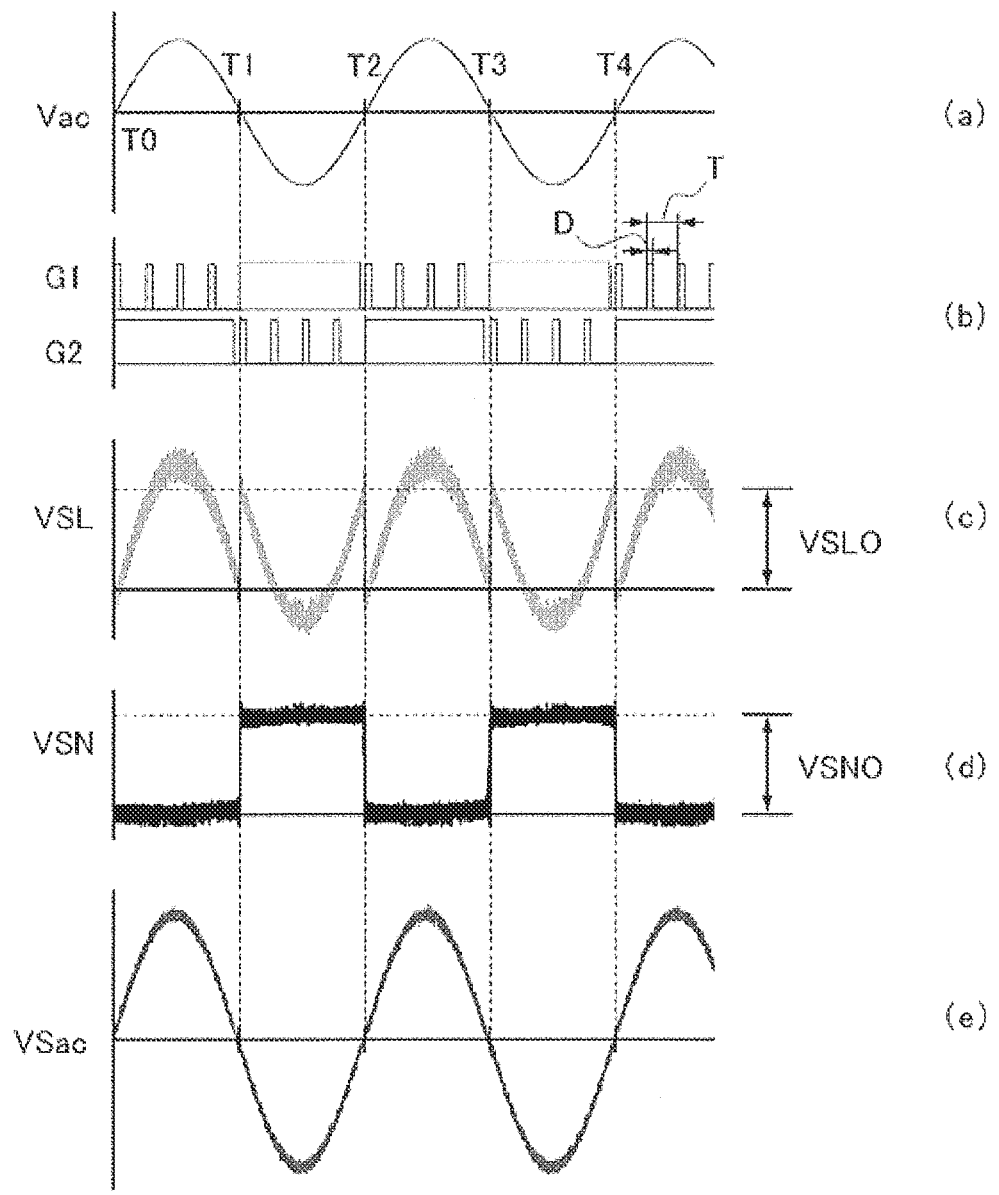
FIG. 2 is a waveform chart for explaining the operation of the switching power supply illustrated in FIG. 1.

The operation of the power factor correction section 2 will be schematically described below with reference to FIG. 1 and FIGS. 2(A) and 2(B). FIG. 2 is a waveform chart illustrating voltage waveforms in the power factor correction section 2, an AC waveform generating section (described later) and others; the abscissa indicates time, and the ordinate indicates voltage. FIG. 2(A) illustrates waveform (sine wave) of AC voltage Vac. Positive half cycle of AC voltage Vac lies between time T0 and time T1, between time T2 and time T3, and others. Negative half cycle of AC voltage Vac lies between time T1 and time T2, between time T3 and time T4, and others.

Drive pulse G1 illustrated in FIG. 2(B) is a drive pulse which drives the first switching device Q1. Drive pulse G2 is a drive pulse which drives the second switching device Q2. These drive pulses have a frequency (higher than audio frequency range; for example, a frequency from 20 kHz to several hundred kHz) substantially higher than the frequency of AC voltage Vac. The switching devices are turned on when the drive pulse is positive, and is turned off when the drive pulse is zero.

In positive half cycle, the first switching device Q1 works as a main switching device of the boost-up converter, and the first inductor L1 works as a boost-up inductor. When the first switching device Q1 is turned on, current flowing from L pole of AC voltage Vac into the first inductor L1 is accumulated as magnetic energy. After passing through the first switching device Q1, the current returns via the second switching device Q2 to N pole of AC voltage Vac.

When the first switching device Q1 is turned off, the magnetic energy accumulated in the first inductor L1 passes, as current, through the third diode D3 and flows to the load 3. The current flows from the load 3 to the second switching device Q2 and returns to N pole of AC voltage Vac. The smoothing capacitor C1 accumulates electric charges when the current is supplied from the first inductor L1, and discharges electric charges when the first inductor L1 accumulates magnetic energy, so that ripples of output voltage Vdo are reduced.

Magnetic energy accumulated by the first inductor L1 depends on the on-duty of the first switching device Q1. Thus, when the on-duty is variable, it is possible to regulate the output voltage Vdo of the power factor correction section 2 (when the period of drive pulse G1 in positive half cycle is T and the width of drive pulse G1 is D, the on-duty of the first switching device Q1 is expressed as D/T). More specifically, in the switching controller 5, drive pulse G1 is subjected to pulse width modulation so that output voltage Vdo detected by the output voltage detecting section 8 has a predetermined voltage level (FIG. 2(B) roughly illustrates the waveform of drive pulse G1, but the illustrated drive pulse G1 is the result of being subjected to pulse width modulation. This is also the case with all drive pulses described below).

In negative half cycle, the second switching device Q2 works as a main switching device of the boost-up converter, and drive pulse G2 of the second switching device Q2 is subjected to pulse width modulation similarly to drive pulse G1 so that output voltage Vdo of the power factor correction section 2 is regulated. More specifically, when the second switching device Q2 is turned on, current flows from N pole (positive voltage) of AC voltage Vac via the second switching device Q2, the first switching device Q1 and the first inductor L1 to L pole of AC voltage Vac (the first inductor L1 accumulates magnetic energy). When the second switching device Q2 is turned off, the first inductor L1 discharges magnetic energy as current, and the current flows to L pole and N pole of AC voltage Vac, the forth diode D4, the load 3, the first switching device Q1 and the first inductor L1.

In positive half cycle, the first switching device Q1 performs a switching operation in which on-state and off-state are repeated; and the second switching device Q2 maintains on-state. In negative half cycle, the second switching device Q2 performs a switching operation in which on-state and off-state are repeated; and the first switching device Q1 maintains on-state (FIG. 2(B)).

Figure 3:
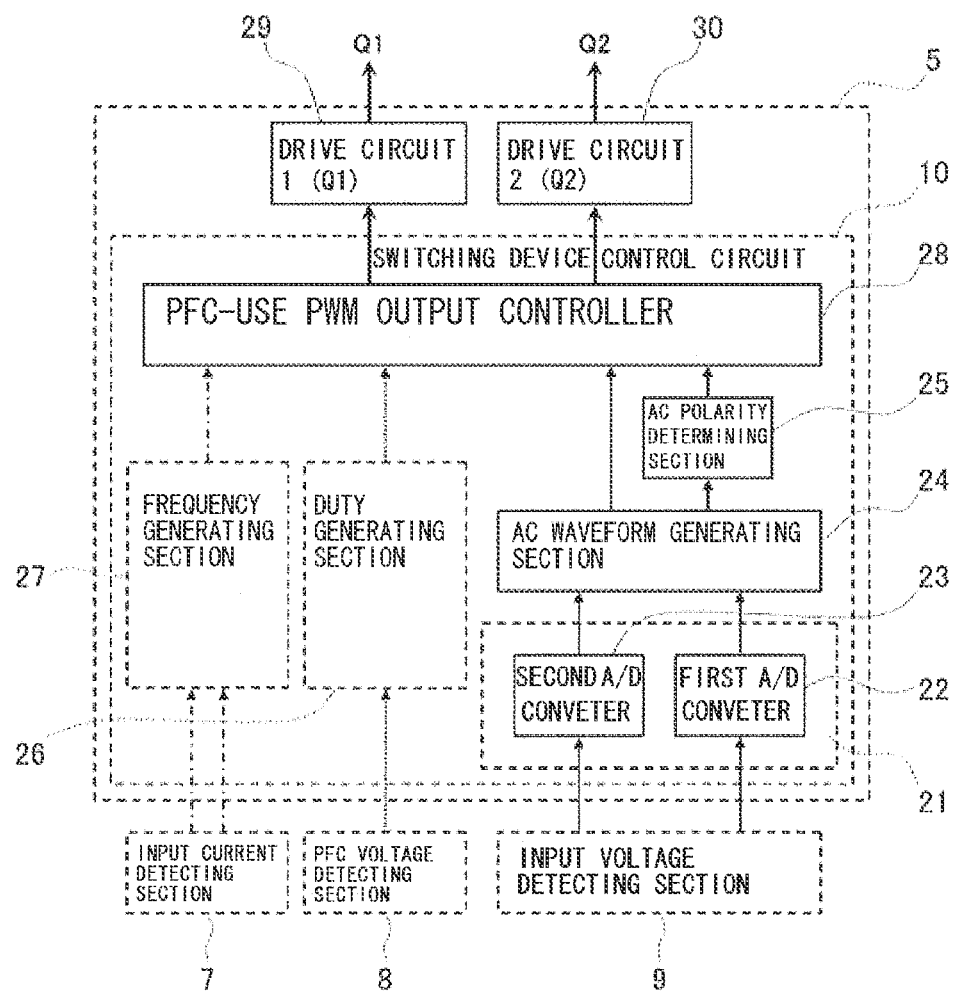
FIG. 3 is a view illustrating a substantial configuration of a switching controller included in the switching power supply illustrated in FIG. 1.

The switching controller 5 (FIG. 3), which includes a switching device control circuit 10, a first drive circuit 29 and a second drive circuit 30, determines positive half cycle or negative half cycle of AC voltage Vac, and regulates output voltage Vdo of the power factor correction section 2 to a predetermined voltage level. The switching device control circuit 10 includes a first AD converter 22, a second AD converter 23, an AC waveform generating section 24, an AC polarity determining section 25, a duty generating section 26, a frequency generating section 27 and a PFC-use PWM controller 28. One output of the PFC-use PWM controller 28 passes through the first drive circuit 29 and is provided as drive pulse G1. The other output thereof passes through the second drive circuit 30 and is provided as drive pulse G2.

The frequency generating section 27 and the duty generating section 26 control the PFC-use PWM controller 28 based on current detected by the reactor current detecting section 7 and on voltage (output voltage Vdo of the power factor correction section 2) detected by the output voltage detecting section 8, so that the duty ratio (pulse width) and the frequency of drive pulses G1 and G2 are regulated.

L pole detected voltage VSL detected by the input voltage detecting section 9 is inputted to the first AD converter 22 to be converted to a digital signal corresponding to L pole detected voltage VSL. Similarly, N pole detected voltage VSN detected by the input voltage detecting section 9 is inputted to the second AD converter 23 and is converted to a digital signal corresponding to N pole detected voltage VSN. Of course, the first AD converter 22 and the second AD converter 23 perform the analog-to-digital conversion in a period substantially shorter than the period of AC voltage Vac. In this case, a voltage divider circuit may be provided between the input voltage detecting section 9 and the first AD converter 22 and between the input voltage detecting section 9 and the second AD converter 23.

<Waveforms of L Pole Detected Voltage VSL, N Pole Detected Voltage VSN and Others>

Drive pulse waveforms of the switching devices, and waveforms of L pole detected voltage VSL and others will be described (FIGS. 2(A) to 2(E)). In positive half cycle of AC voltage Vac, N pole detected voltage VSN relative to the ground GND is substantially zero volt (FIG. 2(D)). In negative half cycle, N pole detected voltage VSN is DC offset VSNO corresponding to output voltage Vdo (FIG. 2(D)). The envelope of the rectangular wave illustrated in FIG. 2(D) has a width in the direction of amplitude due to overlapping of switching noises of the boost-up converter (this is also the case with L pole detected voltage VSL described later).

Voltage relative to the ground GND at the L pole input terminal 21a is obtained by adding AC voltage Vac to voltage at the N pole input terminal 21b. Consequently, in positive half cycle, the waveform of L pole detected voltage VSL is, as illustrated in FIG. 2(C), positive sine wave (positive voltage) having no DC component; in negative half cycle, the waveform of L pole detected voltage VSL is negative sine wave (negative voltage) having DC offset VSLO (corresponding to DC offset VSNO) added thereto.

From L pole detected voltage VSL and N pole detected voltage VSN thus generated, the AC waveform generating section 24 generates AC waveform VSac in such a way as described below (AC waveform VSac corresponds to the waveform of AC voltage Vac and can thus be taken as AC waveform data).

<AC Waveform Generation>

The AC waveform generating section 24 perform a predetermined arithmetic processing on digitalized L pole detected voltage VSL and digitalized N pole detected voltage VSN and generates AC waveform VSac having a frequency and phase synchronized with AC voltage Vac. This generation of AC waveform VSac is performed, for example, by the following arithmetic processing (in the arithmetic formulas, only reference characters of the voltages are described. Further, each of the voltages is of an instantaneous value).

$$VSac = a \times VSL - b \times VSN \quad \text{(formula 1)}$$

where when a=1 and b=1, $$VSac = VSL - VSN \quad \text{(formula 2)},$$

and thus, AC waveform VSac (FIG. 2(E)) corresponding to AC voltage Vac is generated. Since AC voltage Vac is applied across the L pole input terminal 21a and the N pole input terminal 21b, it is apparent that AC waveform VSac corresponds to AC voltage Vac.

<AC Polarity Determination>

The AC polarity determining section 25 determines positive half cycle or negative half cycle of AC voltage Vac (the determining method will be described in "AC waveform generating method"). The AC polarity determining section 25 outputs the result of the determination to the PFC-use PWM controller 28. The switching controller 5 controls based on the result of the determination, the operation of the boost-up converter in positive half cycle or in negative half cycle, so that a predetermined level of output voltage Vdo is maintained.

<AC Waveform Generating Method>

An embodiment (embodiment 1) of the AC waveform generating method for the switching power supply according to the present invention will be described with reference to FIG. 4. The switching controller 5, including the switching device control circuit 10 constituted of an operational unit such as a microcomputer, executes predetermined steps (based on program control) and thereby generates AC waveform VSac. In the switching controller 5, based on a control reference cycle (clock) substantially shorter than that of AC voltage Vac, the first AD converter 22 and the other circuits are controlled, and the steps are also executed.

The AC waveform generating method will be described below with reference to FIG. 4. The control for the AC waveform generating method starts when a switching power supply 1 is turned on.

<Step S101>

At the time of turning on the switching power supply 1, L pole detected voltage VSL and N pole detected voltage VSN are still not acquired and thus the polarity (positive half cycle or negative half cycle) of AC voltage Vac is still not determined. Accordingly, in the switching controller 5, in order to define control conditions of the PFC-use PWM controller 28, AC polarity determination is temporarily set (that is, initial setting). The following description is about an example where positive half cycle is initially set (alternatively, negative half cycle may be set).

<Step S102>

After step S101, the switching controller 5 detects L pole detected voltage VSL and N pole detected voltage VSN at the input section 11 (input-section voltage acquisition) and then checks whether acquisition of digital data obtained by a converting processing in the first AD converter 22 and the second AD converter 23 is completed (step S102). If the acquisition is not completed (No), acquisition of digital data continues; if the acquisition is completed (Yes), the flow proceeds to step S103. Here, step S102 is input-section voltage acquiring step.

The reason why the above processing is necessary is as follows: that is, L pole detected voltage VSL and N pole detected voltage VSN are converted to digital data by the first AD converter 22 and the second AD converter 23, but immediately after the start-up, the digital data conversion by the two AD converters is not completed, and only after completion of acquisition of digital data corresponding to at least one period, the operation can proceed to the step of AC polarity determination.

<Step S103>

The switching controller 5 saves in a storage unit (not illustrated), L pole detected voltage VSL and N pole detected voltage VSN acquired as digital data, and then proceeds to step S104. It is noted that L pole detected voltage VSL and N pole detected voltage VSN saved in step S103 immediately after the start-up are data acquired based on the initial setting.

<Step S104>

The switching controller 5 determines for each control reference cycle, magnitude relation between L pole detected voltage VSL and N pole detected voltage VSN saved in step S103. If L pole detected voltage VSL is greater than N pole detected voltage VSN (Yes), the switching controller 5 proceeds to step S105; if L pole detected voltage VSL is not greater than N pole detected voltage VSN (No), the switching controller 5 proceeds to step S110. When the result of determination is Yes, AC voltage Vac is in positive half cycle; when the result of determination is No, AC voltage Vac is in negative half cycle (refer to FIGS. 2(C) and 2(D)).

<Step S105>

The switching controller 5 determines that AC voltage Vac is in positive half cycle, and saves this in a storage unit (not illustrated) and thereafter proceeds to step S106.

<Step S110>

The switching controller 5 determines that AC voltage Vac is in negative half cycle, and saves this in a storage unit (not illustrated) and thereafter proceeds to step S111.

Step S105 and step S110 are cycle determining step of determining whether AC voltage Vac is in positive or negative half cycle.

<Step S106>

The switching controller 5 calculates (formula 106) based on L pole detected voltage VSL and N pole detected voltage VSN saved as digital data in the storage unit (not illustrated), positive half cycle voltage VSac1 (first voltage waveform) of AC waveform VSac for each control reference cycle and saves the calculated data in the storage unit (not illustrated) and thereafter proceeds to step S107.

$$VSac1 = a \times VSL - b \times VSN \quad \text{(formula 106)}$$

where when a=1 and b=1, based on the above described formula 1, formula 106 is expressed as:

$$VSac1 = VSL - VSN \quad \text{(formula 106')}$$

<Step S111>

Similarly to step S106, the switching controller 5 calculates (formula 111) negative half cycle voltage VSac2 (second voltage waveform) of AC waveform VSac and saves the calculated data in the storage unit (not illustrated) and thereafter proceeds to step S107.

$$VSac2 = a \times VSL - b \times VSN \quad \text{(formula 111)}$$

where when a=1 and b=1, based on the above described formula 1, formula 111 is expressed as:

$$VSac2 = VSL - VSN \quad \text{(formula 111')}$$

<Step S107>

Positive half cycle voltage VSac1 saved in step S106 and negative half cycle voltage VSac2 saved in step S111 are inputted to the AC waveform generating section 24 for each half cycle, so that AC signal of one cycle constituted of positive and negative half cycles is generated. Further, noise components included in positive half cycle voltage VSac1 and negative half cycle voltage VSac2 are removed by use of a moving average processing or something like that (that is, AC voltage Vasc is generated).

Since formula 106 and formula 111 are identical to each other, successive half cycles may also be generated as pulsating current waveform signals of the same polarity. In this case, also, determination of positive or negative half cycle of AC voltage Vac has already has been performed in step S104; thus, the operation of the switching controller 5 is not adversely affected by the generation of pulsating current waveform signals.

Steps S106, S107 and S111 are voltage waveform calculating step.

<Step S108>

The AC waveform generating section 24 sets, as a waveform to be inputted to the PFC-use PWM controller 28, AC voltage Vasc being the result of waveform shaping in step S107 and thereafter proceeds to step S109. This step S108 is AC waveform setting step.

<Step S109>

After setting AC voltage Vasc, the switching controller 5 deletes one part of digital data of positive half cycle voltage VSac1 and negative half cycle voltage VSac2 saved for generation of the subsequent AC voltage Vasc, the one part being not needed for generation of the subsequent AC voltage Vasc. Thereafter, the flow returns to step S102 (for example, when AC voltage Vac is in positive half cycle, after execution of steps S106 to S108, digital data of the preceding negative half cycle is deleted for processing of the next negative half cycle).

The storage unit (not illustrated) may be a storage area of operational unit such as a microcomputer, or may be separately arranged in the power supply 1.

A variation of the switching power supply 1 will be described below.

<Variation 1>

Figure 5:
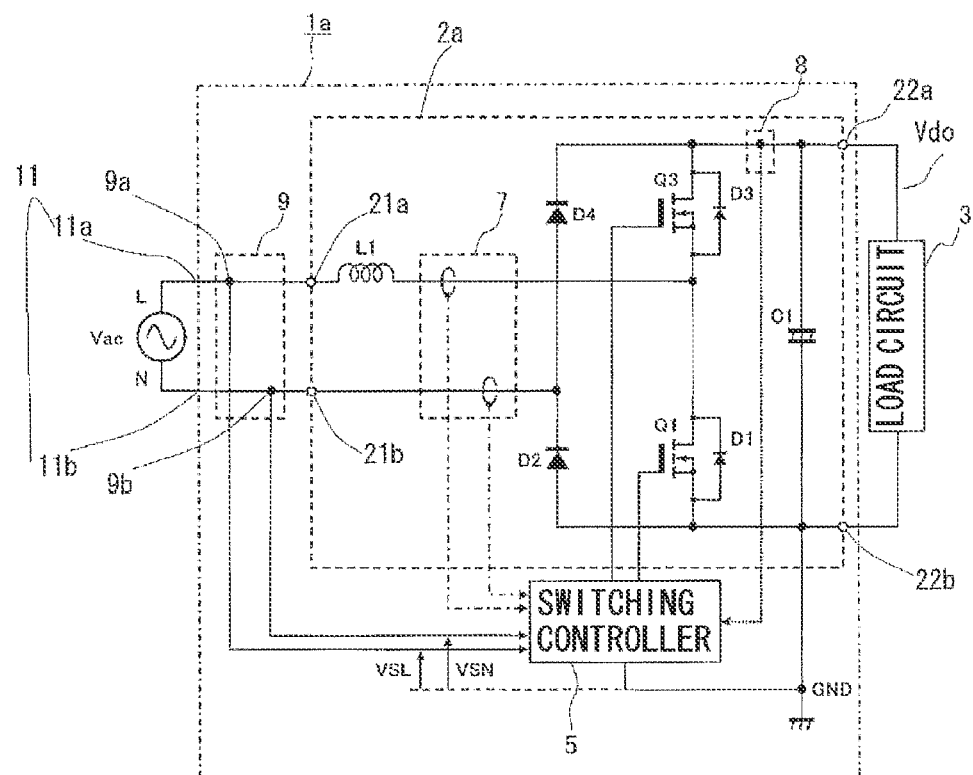
FIG. 5 is a view illustrating a substantial circuit configuration in a variation (variation 1) of the switching power supply according to the present invention.

FIG. 5 is a view illustrating a substantial circuit configuration in a variation (variation 1) of the switching power supply 1. The same reference characters are applied to constituent elements having the same function as embodiment 1, and an explanation thereof is omitted.

<Configuration of Switching Power Supply>

A power factor correction section 2a illustrated in FIG. 5 includes a first switching device Q1, a third switching device Q3, a second diode D2, a forth diode D4 and a first inductor L1.

In the power factor correction section 2a, the drain of the first switching device Q1 and the source of the third switching device Q3 are connected (a series connection of Q1 and Q3). The cathode of the second diode D2 and the anode of the forth diode D4 are connected (a series connection of D2 and D4). In addition, the cathode of the forth diode D4 and the drain of the third switching device Q3 are connected and further connected to the L pole output terminal 22a. The source of the first switching device Q1 and the anode of the second diode D2 are connected and further connected to the N pole output terminal 22b.

The L pole input terminal 21a is connected via the first inductor L1 to a connecting point of the first switching device Q1 and the third switching device Q3. The N pole input terminal 21b is directly connected to a connecting point of the second diode D2 and the forth diode D4.

<Outline of Operation of Power Factor Correction Section>

Figure 6:
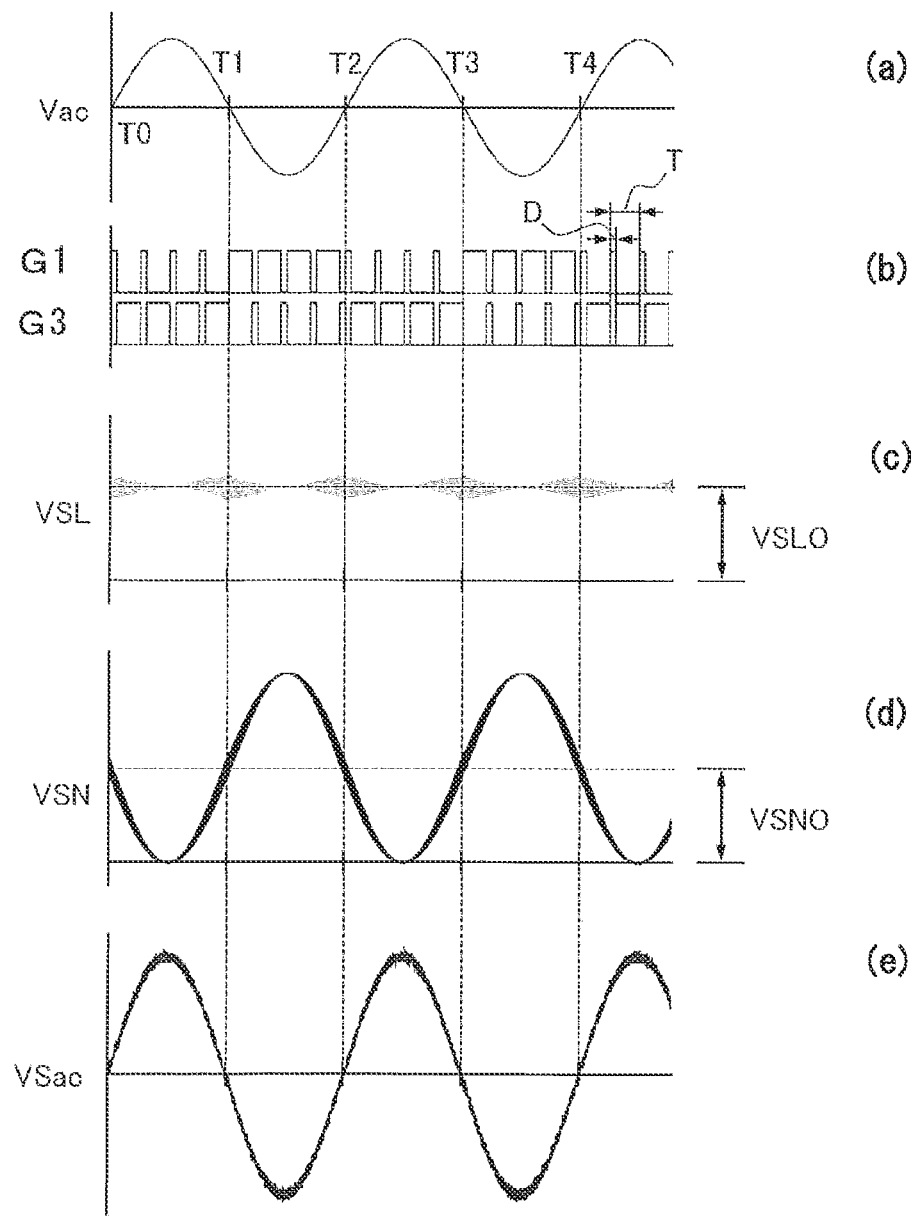
FIG. 6 is a waveform chart for explaining the operation of the switching power supply (variation 1) illustrated in FIG. 5.

Pulse G1 illustrated in FIG. 6(B) is a drive pulse which drives the first switching device Q1. Pulse G3 is a drive pulse which drives the third switching device Q3. In both positive half cycle and negative half cycle, when one of the first switching device Q1 or the third switching device Q3 is in the on state, the other is in the off state.

In positive half cycle, the first switching device Q1 works as a main switching device of the boost-up converter. The third switching device Q3 (including the parasitic diode D3) works instead of the third diode D3 of the power factor correction section 2; the second diode D2 works instead of the second switching device Q2 (including the parasitic diode D2) of the power factor correction section 2.

In negative half cycle, the third switching device Q3 works as a main switching device of the boost-up converter. When the third switching device Q3 is turned on, current flowing from the forth diode D4 is accumulated as magnetic energy in the first inductor L1. When the third switching device Q3 is turned off, the magnetic energy of the first inductor L1 flows, as current, passes through L pole of AC voltage Vac, N pole of AC voltage Vac and the forth diode D4 and flows to the load 3. The current flows from the load 3 to the first switching device Q1 and returns to the first inductor L1.

<Waveforms of L Pole Detected Voltage VSL, N Pole Detected Voltage VSN and Others>

Waveforms of drive pulses of the switching devices, and waveforms of L pole detected voltage VSL and others will be described with reference to FIGS. 6(A) to 6(E). FIGS. 6(A) to 6(E) illustrate waveforms at the measurement points corresponding to those of FIGS. 2(A) to 2(E).

The voltage of the L pole input terminal 21a relative to the ground GND, that is, L pole detected voltage VSL is DC offset VSLO in both positive half cycle and negative half cycle (FIG. 6(C)). The voltage of the N pole input terminal 21b, that is, N pole detected voltage VSN is obtained by subtracting AC voltage Vac from the DC voltage of L pole input terminal 21a. Consequently, the waveform of N pole detected voltage VSN is obtained by subtracting the waveform of AC voltage Vac from DC offset VSNO (=VSLO) (FIG. 6(d)).

<AC Waveform Generation and AC Waveform Generating Method>

Figure 4:
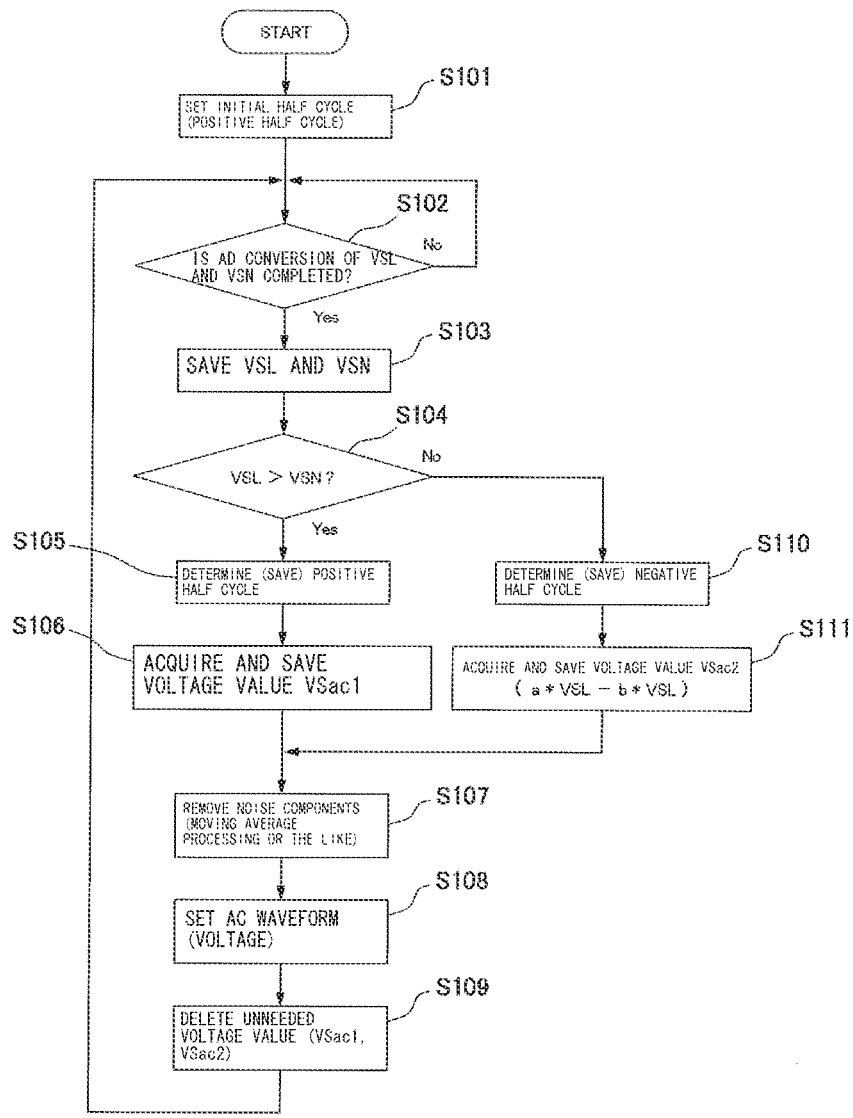
FIG. 4 is a flowchart in an embodiment of an AC waveform generating method for the switching power supply according to the present invention.

From L pole detected voltage VSL and N pole detected voltage VSN, the AC waveform generating section 24 generates AC waveform VSac, similarly to the switching power supply 1, based on the AC waveform generating method illustrated in FIG. 4. (FIG. 6(E))

<Variation 2>

Figure 7:
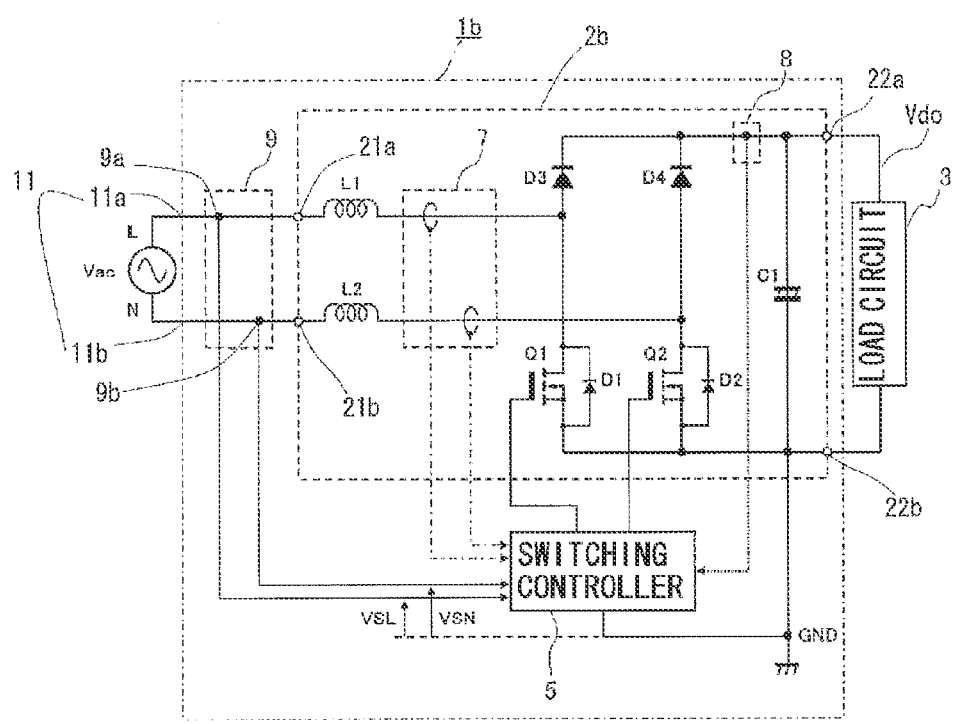
FIG. 7 is a view illustrating a substantial circuit configuration in a variation (variation 2) of the switching power supply according to the present invention.

FIG. 7 is a view illustrating a substantial circuit configuration in a variation (variation 2) of the switching power supply 1. The same reference characters are applied to constituent elements having the same function as embodiment 1, and an explanation thereof is omitted.

<Configuration of Switching Power Supply>

A power factor correction section 2b of a switching power supply 1b illustrated in FIG. 7 is identical to the power factor correction section 2 with respect to the connection of the switching devices, the diodes and the first inductor L1. The difference of the power factor correction section 2b from the power factor correction section 2 lies in that the N pole input terminal 21b is connected via a second inductor L2 to a connecting point of the second switching device Q2 and the forth diode D4.

<Outline of Operation of Power Factor Correction Section>

Figure 8:
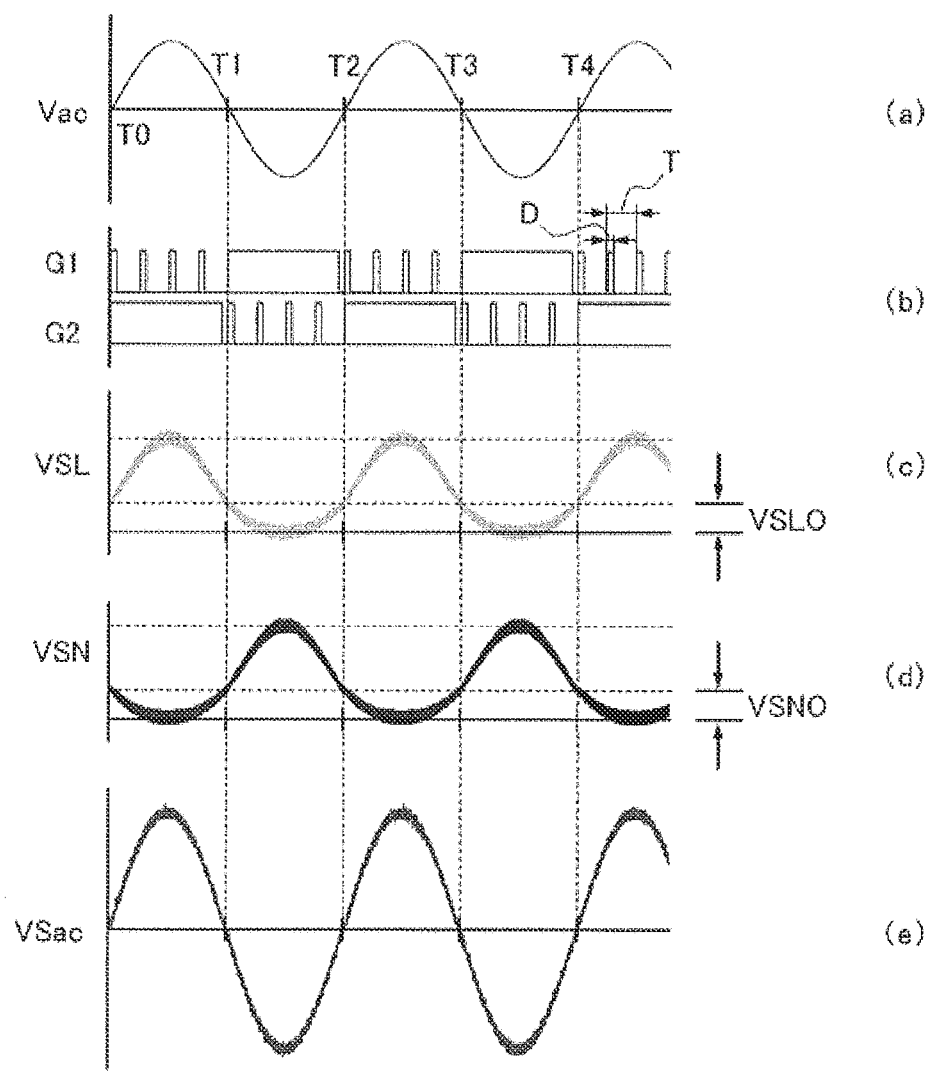
FIG. 8 is a waveform chart for explaining the operation of the switching power supply (variation 2) illustrated in FIG. 7.

The waveforms (FIG. 8(B)) of drive pulse G1 and drive pulse G2 are identical to those of the power factor correction section 2 (FIG. 2(B)). In positive half cycle, the first switching device Q1 and the first inductor L1 constitutes a boost-up converter; and the magnetic energy accumulated in the first inductor L1 passes, as current, through the third diode D3 and is supplied to the load 3. When the first switching device Q1 is in the on state, the current passing through the second inductor L2 is current which flows from the first switching device Q1 via the ground GND to the second switching device Q2; when the first switching device Q1 is in the off state, the current passing through the second inductor L2 is current which flows from the load 3 via the ground GND to the second switching device Q2. In both cases, the current passing through the second inductor L2 is current flowing from the power factor correction section 2b toward N pole of AC voltage Vac.

In negative half cycle, the second switching device Q2 and the second inductor L2 constitutes a boost-up converter; and when the second switching device Q2 is in the on state, magnetic energy is accumulated in the second inductor L2, and when the second switching device Q2 is in the off state, the accumulated magnetic energy passes, as current, through the forth diode D4 and is supplied to the load 3. In both cases, the current passing through the second inductor L2 is current flowing from N pole of AC voltage Vac toward power factor correction section 2b.

<Waveforms of L Pole Detected Voltage VSL, N Pole Detected Voltage VSN and Others>

N pole detected voltage VSN is substantially DC offset VSNO (including some AC components, though) in positive half cycle, and has a waveform of voltage corresponding to AC voltage Vac in negative half cycle (FIG. 8(D)). The waveform of L pole detected voltage VSL, obtained by adding AC voltage Vac to N pole detected voltage VSN, is one corresponding to AC voltage Vac in positive half cycle and is substantially DC offset VSLO (including some AC components, though) in negative half cycle (FIG. 8(C)).

<AC Waveform Generation and AC Waveform Generating Method>

From L pole detected voltage VSL and N pole detected voltage VSN, the AC waveform generating section 24 generates AC waveform VSac, similarly to the switching power supply 1, based on the AC waveform generating method illustrated in FIG. 4. (FIG. 8(E))

<Variation 3>

Figure 9:
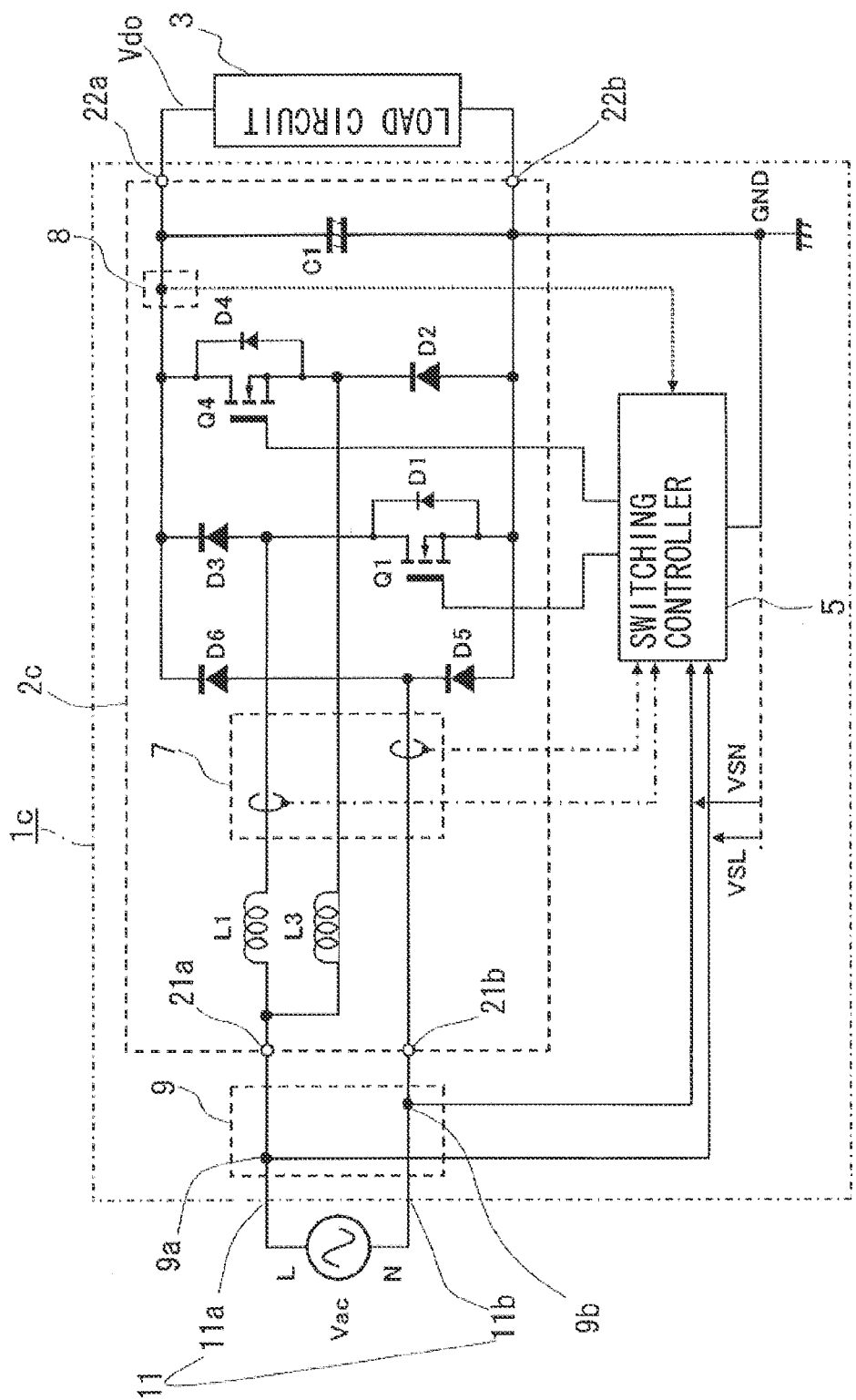
FIG. 9 is a view illustrating a substantial circuit configuration in a variation (variation 3) of the switching power supply according to the present invention.

FIG. 9 is a view illustrating a substantial circuit configuration in a variation (variation 3) of the switching power supply 1. The same reference characters are applied to constituent elements having the same function as embodiment 1, and an explanation thereof is omitted.

<Configuration of Switching Power Supply>

A power factor correction section 2c included in a switching power supply 1c illustrated in FIG. 9 includes a first switching device Q1, a second diode D2, a third diode D3, a fourth switching device Q4, a fifth diode D5, a sixth diode D6, a first inductor L1 and a third inductor L3, and is identical to the power factor correction section 2 with respect to the connection of the first switching device Q1, the third diode D3 and the first inductor L1.

However, a difference between the power factor correction section 2c and the power factor correction section 2 lies in that the anode of the second diode D2 is connected to the N pole output terminal 22b, the cathode of the second diode D2 is connected to the source of the fourth switching device Q4, and the drain of the fourth switching device Q4 is connected to the L pole output terminal 22a.

Another difference between the power factor correction section 2 and the power factor correction section 2*c* lies in that the power factor correction section 2*c* includes the third inductor L3; more specifically, the L pole input terminal 21*a* is connected via the third inductor L3 to a connecting point of the second diode D2 and the fourth switching device Q4.

Another difference between the power factor correction section 2 and the power factor correction section 2*c* lies in that the power factor correction section 2*c* includes the fifth diode D5 and the sixth diode D6 connected in series; more specifically, the fifth diode D5 is connected so as to form a current path from the N pole output terminal 22*b* to the AC N pole input terminal 11*b*, and the sixth diode D6 is connected so as to form a current path from the N pole input terminal 21*b* to the L pole output terminal 22*a*.

<Outline of Operation of Power Factor Correction Section>

In positive half cycle, the first switching device Q1 works as a main switching device of the boost-up converter; and the first inductor L1 works as a boost-up inductor. The first switching device Q1 and the first inductor L1 function as in the power factor correction section 2. It is noted that current passing through the first switching device Q1, and current returning from the load 3 pass through the fifth diode D5 and return to N pole of AC voltage Vac.

In negative half cycle, the fourth switching device Q4 works as a main switching device of the boost-up converter; and the third inductor L3 works as a boost-up inductor. When the fourth switching device Q4 is in the on state, current flows from N pole of AC voltage Vac to the sixth diode D6, the fourth switching device Q4 and the third inductor L3 and returns to L pole of AC voltage Vac. When the fourth switching device Q4 is in the off state, current flows from the third inductor L3 via AC voltage Vac to the sixth diode D6, the load 3 and the second diode D2 and returns to the third inductor L3.

<Waveforms of L Pole Detected Voltage VSL, N Pole Detected Voltage VSN and Others>

Waveforms of drive pulses of the switching devices, and waveforms of N pole detected voltage VSN and others will be described with reference to FIGS. 10(A) to 10(E). FIGS. 10(A) to 10(E) illustrate waveforms at the measurement points corresponding to those of FIGS. 2(A) to 2(E), and an explanation thereof is partly omitted.

Figure 10:
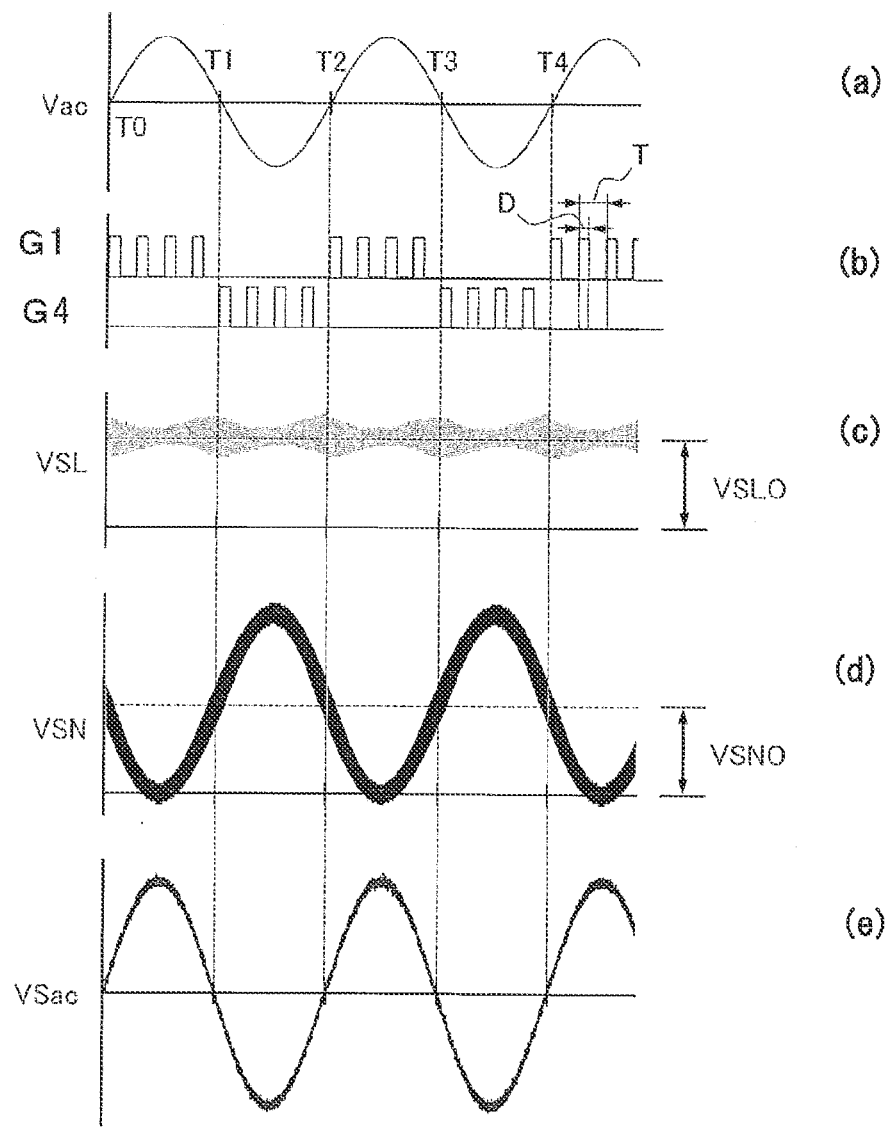
FIG. 10 is a waveform chart for explaining the operation of the switching power supply (variation 3) illustrated in FIG. 9.

In both positive half cycle and negative half cycle, L pole detected voltage VSL is DC voltage, that is, DC offset VSLO illustrated in FIG. 10(C). In this case switching noises overlap DC offset VSLO. The voltage of the N pole input terminal 21*b* of power factor correction section 2*c* is obtained by subtracting AC voltage Vac from the voltage of the L pole input terminal 21*a*; thus, the waveform of N pole detected voltage VSN is, as illustrated in FIG. 10(D), is an inverted AC voltage waveform of AC voltage Vac, including DC offset VSLN (=VSLO).

<AC Waveform Generation and AC Waveform Generating Method>

From L pole detected voltage VSL and N pole detected voltage VSN, the AC waveform generating section 24 generates AC waveform VSac, similarly to the switching power supply 1, based on the AC waveform generating method illustrated in FIG. 4. (FIG. 10(E))

<Variation 4>

Figure 11:
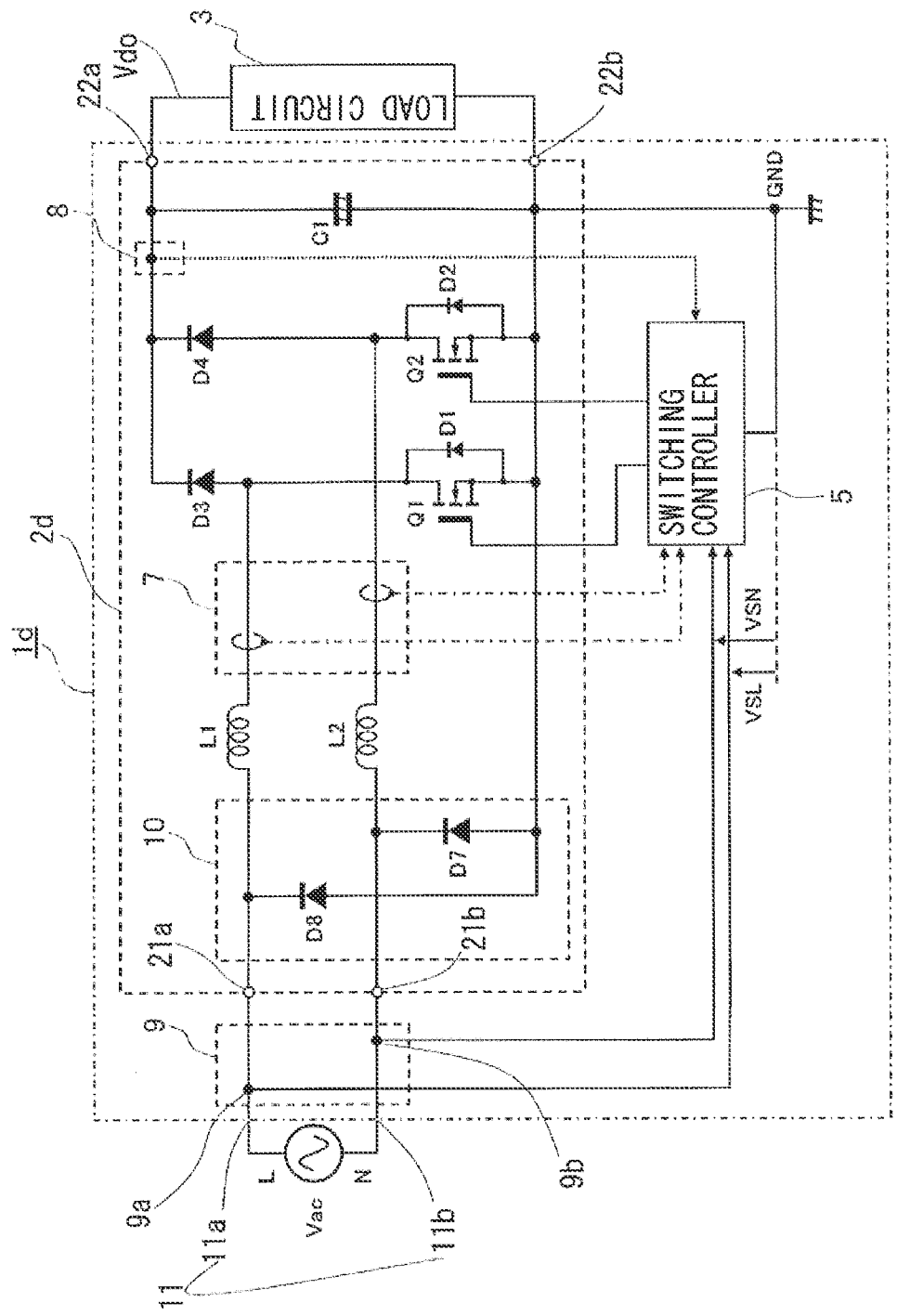
FIG. 11 is a view illustrating a substantial circuit configuration in a variation (variation 4) of the switching power supply according to the present invention.

FIG. 11 is a view illustrating a substantial circuit configuration in a variation (variation 4) of the switching power supply 1. The same reference characters are applied to constituent elements having the same function as embodiment 1, and an explanation thereof is omitted.

<Configuration of Switching Power Supply>

A power factor correction section 2*d* of a switching power supply 1*d* illustrated in FIG. 11 has the same configuration of boost-up converter as the power factor correction section 2*b* of the switching power supply 1*b*. However, there is a difference between the switching power supply 1*d* and the switching power supply 1*b*; the switching power supply 1*d* further includes a seventh diode D7 and an eighth diode D8. The seventh diode D7 is connected so as to form a current path from the N pole output terminal 22*b* to the N pole input terminal 21*b*; and the eighth diode D8 is connected so as to form a current path from the N pole output terminal 22*b* to the L pole input terminal 21*a*.

<Outline of Operation of Power Factor Correction Section>

Figure 12:
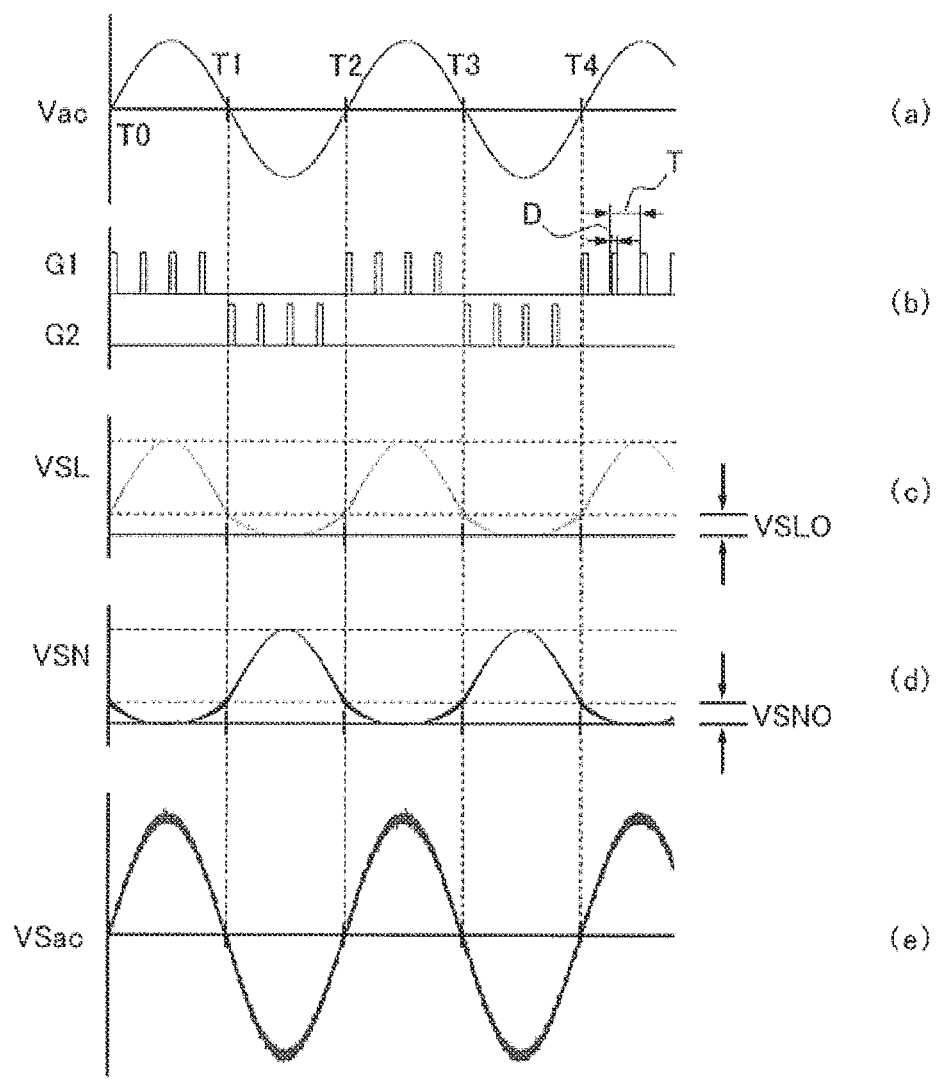
FIG. 12 is a waveform chart for explaining the operation of the switching power supply (variation 4) illustrated in FIG. 11.

The waveform (FIG. 12(B)) of drive pulse G1 used to drive the first switching device Q1 of the power factor correction section 2*d*, and the waveform (FIG. 12(B)) of drive pulse G2 used to drive the second switching device Q2 are identical to those of the power factor correction section 2*c* (refer to FIG. 10(B). In positive half cycle, the first switching device Q1 works as a main switching device of the boost-up converter; and the first inductor L1 works as a boost-up inductor. It is noted that, when the first switching device Q1 is in the on state, current passing through the first switching device Q1, and current returning from the load 3 pass through the seventh diode D7 and return to the N pole input terminal 21*b* of the power factor correction section 2*d*.

In negative half cycle, the second switching device Q2 works as a main switching device of the boost-up converter; and the second inductor L2 works as a boost-up inductor. It is noted that, when the second switching device Q2 is in the on state, current passing through the second switching device Q2, and current returning from the load 3 pass through the eighth diode D8 and return to the L pole input terminal 21*a*.

<Waveforms of L Pole Detected Voltage VSL, N Pole Detected Voltage VSN and Others>

Similarly to the switching power supply 1*b*, N pole detected voltage VSN is substantially DC offset VSNO (including some AC components, though) in positive half cycle, and has a waveform of voltage corresponding to AC voltage Vac in negative half cycle (FIG. 12(D)). The voltage waveform of L pole detected voltage VSL, obtained by adding AC voltage Vac to N pole detected voltage VSN, is one corresponding to AC voltage Vac in positive half cycle and is substantially DC offset VSLO (including some AC components, though) in negative half cycle (FIG. 12(C)).

<AC Waveform Generation and AC Waveform Generating Method>

From L pole detected voltage VSL and N pole detected voltage VSN, the AC waveform generating section 24 generates AC waveform VSac, similarly to the switching power supply 1, based on the AC waveform generating method illustrated in FIG. 4. (FIG. 2(E))

<Variation 5>

Figure 13:
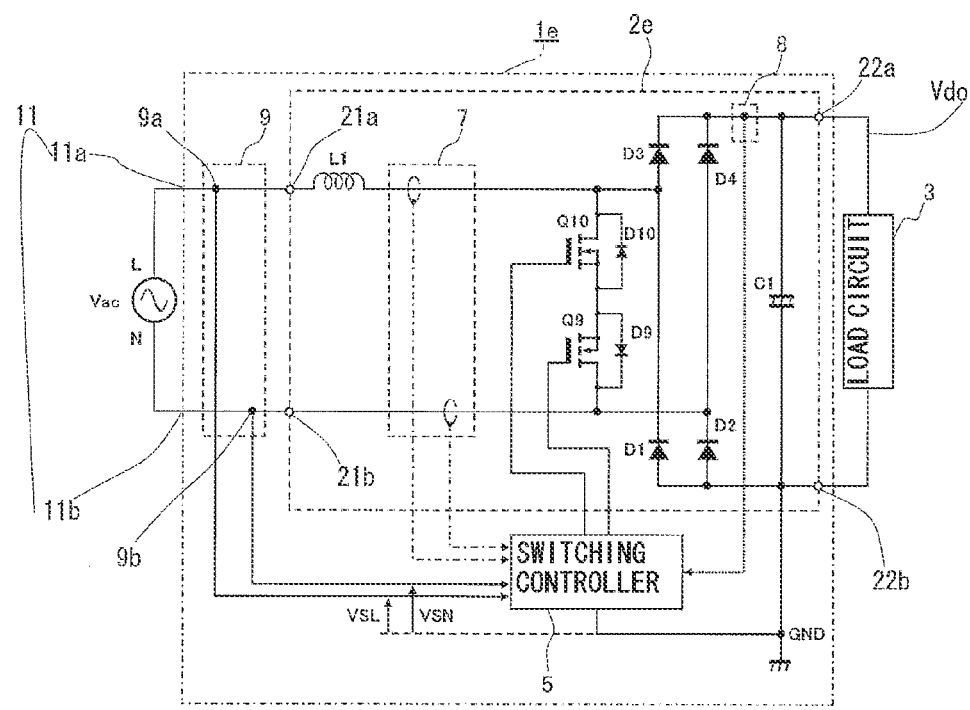
FIG. 13 is a view illustrating a substantial circuit configuration in a variation (variation 5) of the switching power supply according to the present invention.

FIG. 13 is a view illustrating a substantial circuit configuration in a variation (variation 5) of the switching power supply 1. The same reference characters are applied to constituent elements having the same function as embodiment 1, and an explanation thereof is omitted.

<Configuration of Switching Power Supply>

The difference between a switching power supply 1*e* illustrated in FIG. 13 and the other switching power supplies is in the configuration of boost-up converter in a power factor correction section 2*e*; that is, a first diode D1, a second diode D2, a third diode D3 and a forth diode D4 form bridge connection. More specifically, the cathodes of the third diode D3 and the forth diode D4 are connected to the L pole output terminal 22*a*; the anodes of the first diode D1 and the second diode D2 are connected to the N pole output terminal 22b; the L pole input terminal 21a is connected via the first inductor L1 to a connecting point of the first diode D1 and the third diode D3; and the N pole input terminal 21b is directly connected to a connecting point of the second diode D2 and the forth diode D4.

A ninth switching device Q9 (P channel MOF-FET) and a tenth switching device Q10 are connected in series between the connecting point of the second diode D2 and the forth diode D4 and the connecting point of the first diode D1 and the third diode D3; and the sources of the two switching devices are connected to each other.

<Outline of Operation of Power Factor Correction Section>

An outline of operation of the power factor correction section 2e will be described.

Figure 14:
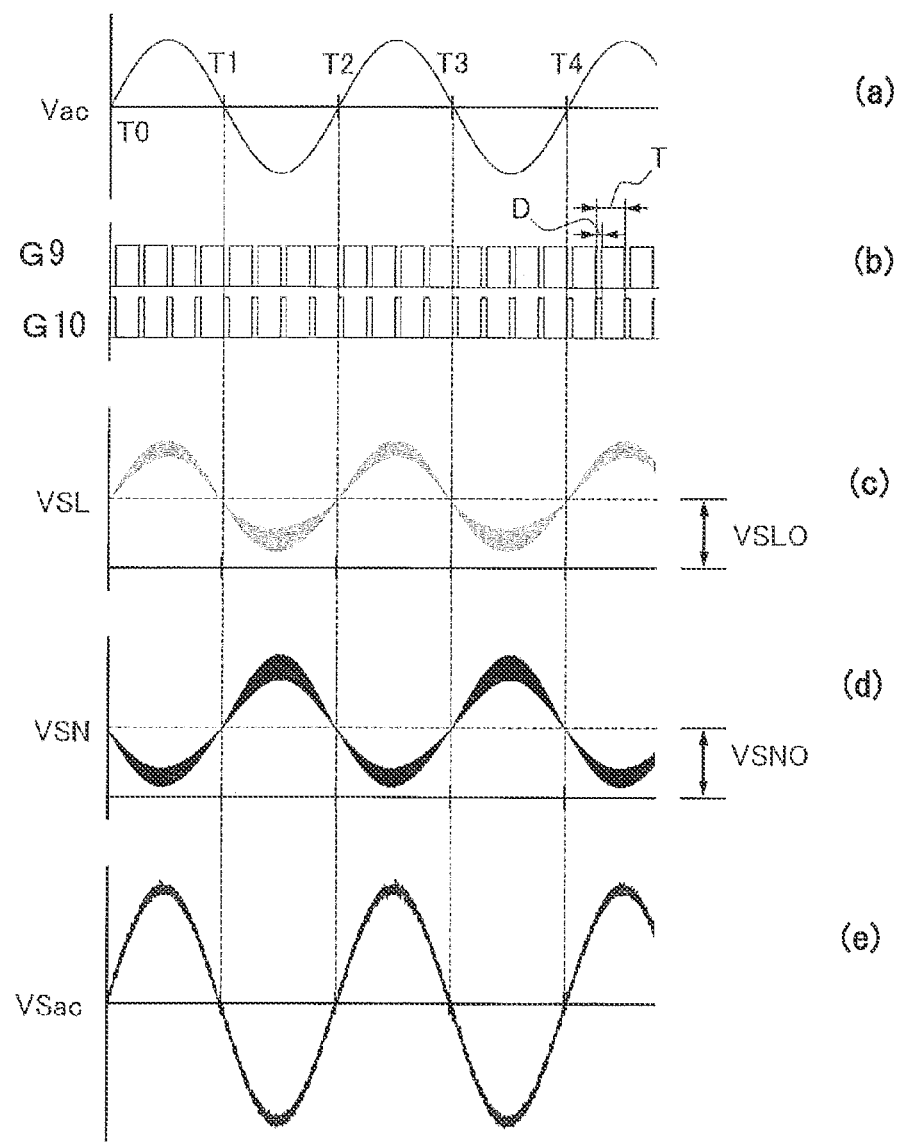
FIG. 14 is a waveform chart for explaining the operation of the switching power supply (variation 5) illustrated in FIG. 13.
Figure 15:
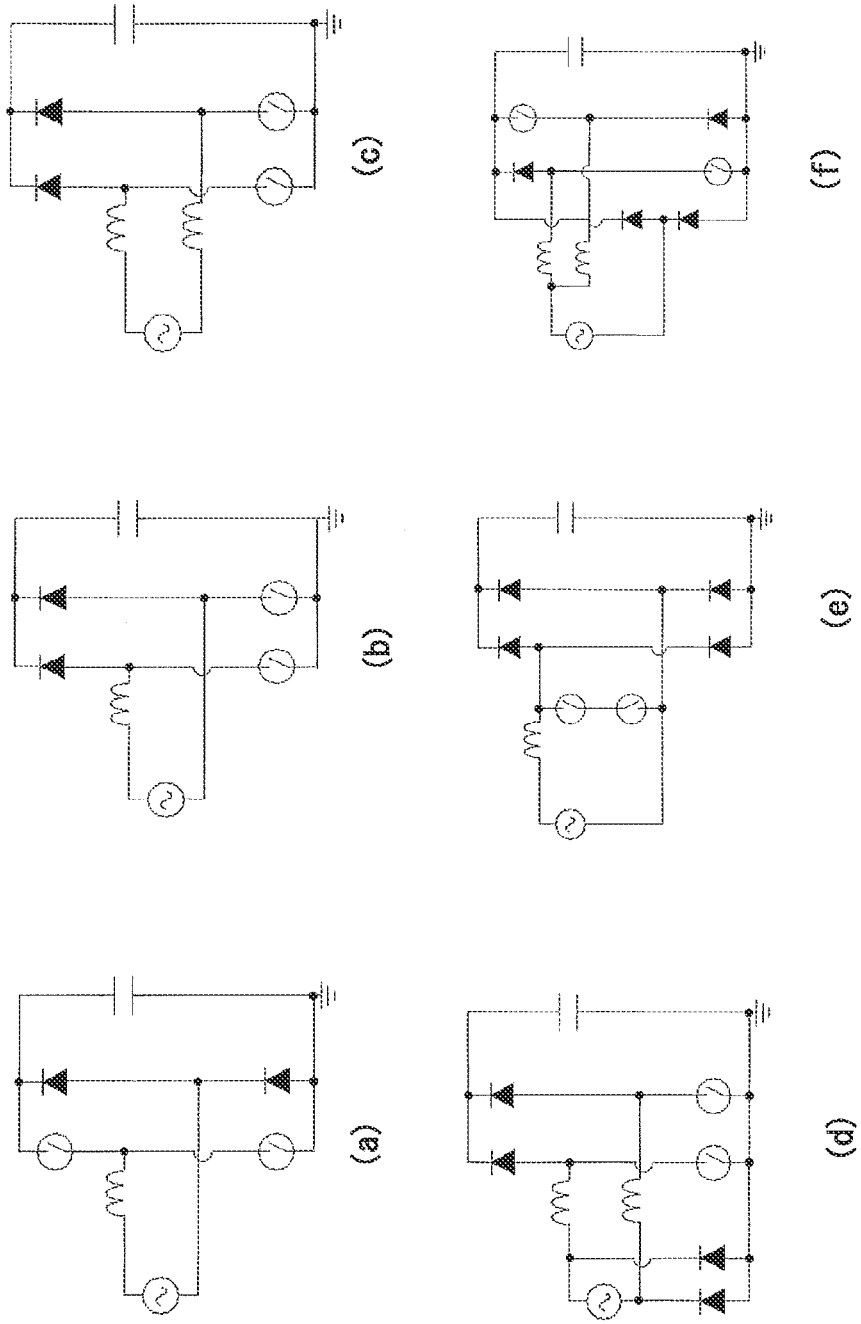
FIG. 15 is a view illustrating an exemplary substantial configuration of a bridgeless power factor correction circuit.

The waveform of drive pulse G9 used to drive the ninth switching device Q9 and the waveform of drive pulse G10 used to drive the tenth switching device Q10 have the same phase; in both positive half cycle and negative half cycle, the ninth switching device Q9 and the tenth switching device Q10 are simultaneously turned on or turned off (refer to FIG. 14(B)).

In positive half cycle, when drive pulse G9 is positive, drive pulse G10 is also positive and thus the ninth switching device Q9 and the tenth switching device Q10 are simultaneously turned on. At this time, the first inductor L1 accumulates magnetic energy. When drive pulse G9 is zero, drive pulse G10 is also zero and thus the ninth switching device Q9 and the tenth switching device Q10 are simultaneously turned off. At this time, the first inductor L1 functions as a boost-up inductor (that is, the magnetic energy accumulated by the first inductor L1 passes, as current, through the third diode D3 and is supplied to the load 3).

In negative half cycle, when drive pulse G9 is positive, drive pulse G10 is also positive and thus the ninth switching device Q9 and the tenth switching device Q10 are simultaneously turned on. At this time, the first inductor L1 accumulates magnetic energy. When drive pulse G9 is zero, drive pulse G10 is also zero and thus the ninth switching device Q9 and the tenth switching device Q10 are simultaneously turned off. At this time, the first inductor L1 functions as a boost-up inductor (that is, the magnetic energy accumulated by the first inductor L1 passes, as current, through the third diode D4 and is supplied to the load 3).

<Waveforms of L Pole Detected Voltage VSL, N Pole Detected Voltage VSN and Others>

Waveforms of drive pulses of the switching devices, and waveforms of L pole detected voltage VSL and others will be described with reference to FIGS. 14(A) to 14(E). FIGS. 14(A) to 14(E) illustrate waveforms at the measurement points corresponding to those of FIGS. 2(A) to 2(E), and an explanation thereof is partly omitted.

An average voltage (DC offset component) of the L pole input terminal 21a and that of the N pole input terminal 21b of the power factor correction section 2e are DC offset VSLO and DC offset VSNO, respectively (FIGS. 14(C) and 14(D)), corresponding to output DC voltage Vdo. AC voltage Vac is applied across the L pole input terminal 21a and the N pole input terminal 21b.

The voltage waveform of L pole detected voltage VSL is obtained by adding DC offset VSLO to a voltage corresponding to AC voltage Vac (FIG. 14(C)). The voltage waveform of N pole detected voltage VSN is obtained by subtracting a voltage corresponding to AC voltage Vac from DC offset VSNO (FIG. 14(D)).

<AC Waveform Generation and AC Waveform Generating Method>

From L pole detected voltage VSL and N pole detected voltage VSN, the AC waveform generating section 24 generates AC waveform VSac, similarly to the switching power supply 1, based on the AC waveform generating method illustrated in FIG. 4. (FIG. 12(E))

It is noted that, in the AC waveform generating method according to the above described embodiment and variations, when a residual DC offset component is included, also, a programmed processing can remove the DC component in the AC waveform setting step (step S108), so that only AC waveform VSac is unfailingly extracted.

In setting or modifying of coefficients a and b, the selection or modification of the parameters can be performed easily and arbitrarily in the program of executing the AC waveform generating method.

The coefficients a and b may be automatically set by program control so that a DC offset component of AC waveform VSac is reduced to zero. It is sufficient that this automatic setting is performed only during a predetermined period from the start-up of the switching power supply to when the switching power supply reaches the steady operating state. When the results of the automatic setting are saved in a storage unit, the saved data can also be used for the subsequent start-up.

Embodiment 2

An embodiment (Embodiment 2) of AC waveform generating method and others used in the switching power supply according to the present invention will be described.

According to the embodiment (Embodiment 2) of AC waveform generating method and others, in formula 111 according to the embodiment (Embodiment 1) of AC waveform generating method and others, for calculating negative half cycle voltage VSac2 (second voltage waveform) of AC waveform VSac, VSL of the first term and VSN of the second term in the right-hand side of the formula are interchanged. That is, $$VSac2 = a \times VSN - b \times VSL \quad \text{(formula 4-1)}$$

Here, when a=1 and b=1, then VSac2=VSN−VSL and $$VSac2 = -(VSL - VSN) \quad \text{(formula 4-2)}$$

The waveform of formula 4-2 is obtained by inverting the waveform of formula 111' (VSac2=VSL−VSN). Accordingly, negative half cycle voltage VSac2 (second voltage waveform) in Embodiment 2 has a positive half cycle voltage waveform.

That is, AC waveform VSac according to Embodiment 2 is pulsating-current waveform constituted of positive sine wave in both positive half cycle and negative half cycle (for example, with reference to FIG. 2(E), AC waveform VSac is positive sine wave both in negative half cycle from T1 to T2 and in negative half cycle from T3 to T4).

AC waveform VSac is needed when the drive pulse used to turn on or turn off the switching devices of the power factor correction section is subjected to frequency modulation; from the viewpoint of circuit configuration, it may be convenient that AC waveform VSac is pulsating-current waveform. Meanwhile, positive half cycle and negative half cycle of AC voltage Vac are determined in step S105 and step S110, respectively, and thus when AC waveform VSac is pulsating-current waveform, also, the power factor correction section can be properly controlled.

Alternatively, in formula 106 for calculating positive half cycle voltage VSac1 (first voltage waveform) of AC waveform VSac, VSL of the first term and VSN of the second term in the right-hand side of the formula may be interchanged. In this case, positive half cycle voltage VSac1 (first voltage waveform) has a negative half cycle voltage waveform and thus AC waveform VSac is negative pulsating-current waveform both in positive half cycle and in negative half cycle.

More specifically, in the present invention, "AC waveform" includes waveforms (for example, AC waveform with DC offset or pulsating-current waveform) having the following characteristic: when a Fourier expansion is applied to those waveforms including a DC component, the level of voltage or others of an input AC waveform can be identified as a waveform level of voltage or others on the time axis.

The PFC switching power supply and the AC waveform generating method for the PFC switching power supply are not limited to the above described embodiments, and various modifications to the embodiments may be practiced without departing from the spirit and gist of the invention.

For example, in a power factor correction section having a circuit configuration different from that of the above embodiments, also, the calculating formula for calculating AC waveform VSac by use of L pole detected voltage and N pole detected voltage can be used in a shared manner or by in a manner setting parameters.

The above description of the embodiments is about a case in which program control by the switching controller is used. However, the constituent elements of the switching controller may be constituted of analog circuits, so that the switching controller is implemented by hardware. For example, the AC waveform generating section may be constituted of an analog adding circuit or others; and the AC polarity determining section may be constituted of a comparator circuit or others. When such a configuration is used, also, there is no need to modify the circuit configuration; thus when a part of circuit coefficients corresponding to the above described parameters are set (for example, the coefficients of the arithmetic circuit for generating AC waveform are set), various bridgeless boost converters can be handled. Thus, the polarity of AC voltage can be determined without using a DC isolator such as a transformer or photo coupler.

The switching power supply having power factor correction according to the present invention can be used as a power supply for the manufacturing or sales of the switching power supply or as a power supply for various types of electric equipment or electronics devices. Further, the AC waveform generating method for the switching power supply according to the present invention can be used in switching power supplies having power factor correction included in various types of electric equipment or electronics devices. Accordingly, both the switching power supply and the AC waveform generating method according to the present invention have industrial applicability.

DESCRIPTION OF SYMBOLS 1, 1a to 1e Switching power supply
2, 2a to 2e Power factor correction section
3 Load circuit (load)
5 Switching controller
7 Reactor current detecting section
9 Input voltage detecting section
11 Input section
11a AC L pole input terminal
11b AC N pole input terminal
G1, G2, G3, G4, G9, G10 Drive pulse
Q1, Q2, Q3, Q4, Q9, Q10 Switching device
Vac AC voltage
VSac AC waveform
VSL L pole detected voltage
VSN N pole detected voltage

What is claimed is:

1. A switching power supply comprising:
an input section connected to an AC power line;
a power factor correction section which rectifies AC voltage inputted to the input section, outputs DC voltage to a load and in addition, corrects a power factor;
an input voltage detecting section which outputs L (live) pole detected voltage corresponding to L pole voltage of the input section and N (neutral) pole detected voltage corresponding to N pole voltage of the input section; and
a switching controller which controls, based on the L pole detected voltage and the N pole detected voltage, an operation of the power factor correction section,
wherein the switching controller includes an AC waveform generating section which generates an AC waveform based on the L pole detected voltage and the N pole detected voltage and outputs the AC waveform as AC waveform data, and
wherein the switching controller generates a drive pulse having a frequency and a duty ratio varying depending on the AC waveform data and uses the drive pulse to drive one or more switching devices included in the power factor correction section, whereby a predetermined level of the DC output of the power factor correction section is maintained and in addition, the power factor is corrected, and
wherein the AC waveform generating section:
compares an amplitude of the L pole detected voltage with an amplitude of the N pole detected voltage;
determines, based on the comparison result, positive half cycle and negative half cycle of the AC voltage;
generates, based on the determination, a voltage waveform from the L pole detected voltage and the N pole detected voltage; and
outputs as the AC waveform data, an AC waveform generated from the voltage waveform.

2. The switching power supply according to claim 1,
wherein, as a result of comparison of the amplitudes of the L pole detected voltage and the N pole detected voltage by the AC waveform generating section,
when the L pole detected voltage is greater than the N pole detected voltage,
the cycle of the AC voltage is determined to be one of positive half cycle and negative half cycle,
a first voltage waveform is generated which corresponds to a waveform being a result of subtracting a voltage obtained by multiplying the N pole detected voltage in the one half cycle by a predetermined second coefficient from a voltage obtained by multiplying the L pole detected voltage in the one half cycle by a predetermined first coefficient, and
wherein when the N pole detected voltage is greater than the L pole detected voltage,
the cycle of the AC voltage is determined to be the other of positive half cycle and negative half cycle,
a second voltage waveform is generated which corresponds to a waveform being a result of subtracting a voltage obtained by multiplying the N pole detected voltage in the other half cycle by the predetermined second coefficient from a voltage obtained by multiplying the L pole detected voltage in the other half cycle by the predetermined first coefficient, and
the voltage waveform is generated based on the first voltage waveform and the second voltage waveform.

3. The switching power supply according to claim 1,
wherein, as a result of comparison of the amplitudes of the L pole detected voltage and the N pole detected voltage by the AC waveform generating section,
when the L pole detected voltage is greater than the N pole detected voltage,
the cycle of the AC voltage is determined to be one of positive half cycle and negative half cycle,
a first voltage waveform is generated which corresponds to a waveform being a result of subtracting a voltage obtained by multiplying the N pole detected voltage in the one half cycle by a predetermined second coefficient from a voltage obtained by multiplying the L pole detected voltage in the one half cycle by a predetermined first coefficient, or
an inverted first voltage waveform is generated which corresponds to a waveform being a result of subtracting a voltage obtained by multiplying the L pole detected voltage in the one cycle by the predetermined first coefficient from a voltage, obtained by multiplying the N pole detected voltage in the one half cycle by the predetermined second coefficient, and
wherein when the N pole detected voltage is greater than the L pole detected voltage,
the cycle of the AC voltage is determined to be the other of positive half cycle and negative half cycle,
an inverted second voltage waveform is generated which corresponds to a waveform being a result of subtracting a voltage obtained by multiplying the L pole detected voltage in the other half cycle by the predetermined first coefficient from a voltage obtained by multiplying the N pole detected voltage in the other half cycle by the predetermined second coefficient, or
a second voltage waveform is generated which corresponds to a waveform being the result of subtracting a voltage obtained by multiplying the N pole detected voltage in the other half cycle by the predetermined second coefficient from a voltage obtained by multiplying the L pole detected voltage in the other half cycle by the predetermined first coefficient, and
the voltage waveform is generated based on the inverted first voltage waveform and the second voltage waveform or based on the first voltage waveform and the inverted second voltage waveform.

4. An AC waveform generating method for a switching power supply, the switching power supply comprising:
an input section connected to an AC power line;
a power factor correction section which rectifies AC voltage inputted to the input section, output DC voltage to a load and in addition, corrects a power factor;
an input voltage detecting section which outputs L (live) pole detected voltage corresponding to L pole voltage of the input section and N (neutral) pole detected voltage corresponding to N pole voltage of the input section; and
a switching controller which controls, based on the L pole detected voltage and the N pole detected voltage, an operation of the power factor correction section,
wherein the AC waveform generating method comprises:
an input-section voltage acquiring step of acquiring the L pole detected voltage and the N pole detected voltage;
a cycle determining step of comparing amplitudes of the L pole detected voltage and the N pole detected voltage and thereby determining whether the AC voltage is in positive half cycle or in negative half cycle;
a voltage waveform calculating step of calculating, based on the L pole detected voltage and the N pole detected voltage, respective voltage waveforms of the positive half cycle and the negative half cycle; and
an AC waveform setting step of combining the respective voltage waveforms calculated for each of the positive half cycle and the negative half cycle and thereby setting the resultant waveform as AC waveform, and
wherein in the cycle determining step,
(A) when it is determined that the L pole detected voltage is greater than the N pole detected voltage, the cycle of the AC voltage is determined to be one of the positive half cycle and the negative half cycle,
(B) when it is determined that the N pole detected voltage is greater than the L pole detected voltage, the cycle of the AC voltage is determined to be the other of the positive half cycle and the negative half cycle,
(A1) when the cycle of the AC voltage is determined to be one of the positive half cycle and the negative half cycle, a first voltage waveform is generated which corresponds to a value being a result of subtracting a voltage obtained by multiplying the N pole detected voltage in the one half cycle by a predetermined second coefficient from a voltage obtained by multiplying the L pole detected voltage in the one half cycle by a predetermined first coefficient,
(B1) when the cycle of the AC voltage is determined to be the other of the positive half cycle and the negative half cycle, a second voltage waveform is generated which corresponds to a value being a result of subtracting a voltage obtained by multiplying the N pole detected voltage in the other half cycle by the predetermined second coefficient from a voltage obtained by multiplying the L pole detected voltage in the other half cycle by the predetermined first coefficient, and
(C) in the AC waveform setting step, the AC waveform is set based on the first voltage waveform and the second voltage waveform.

5. The AC waveform generating method according claim 4, used in the switching power supply,
wherein in the cycle determining step,
(A) when it is determined that the L pole detected voltage is greater than the N pole detected voltage, the cycle of the AC voltage is determined to be one of the positive half cycle and the negative half cycle,
(B) when it is determined that the N pole detected voltage is greater than the L pole detected voltage, the cycle of the AC voltage is determined to be the other of the positive half cycle and the negative half cycle,
(A1) when the cycle of the AC voltage is determined to be one of the positive half cycle and the negative half cycle, a first voltage waveform is generated which corresponds to a value being a result of subtracting a voltage obtained by multiplying the N pole detected voltage in the one half cycle by a predetermined second coefficient from a voltage obtained by multiplying the L pole detected voltage in the one half cycle by a predetermined first coefficient,
(A2) or, an inverted first voltage waveform is generated which corresponds to a value being a result of subtracting a voltage obtained by multiplying the L pole detected voltage in the one cycle by the predetermined first coefficient from a voltage obtained by multiplying the N pole detected voltage in the one half cycle by the predetermined second coefficient,
(B1) when the cycle of the AC voltage is determined to be the other of the positive half cycle and the negative half cycle, a second voltage waveform is generated which corresponds to a value being a result of subtracting a voltage obtained by multiplying the N pole detected voltage in the other half cycle by the predetermined second coefficient from a voltage obtained by multiplying the L pole detected voltage in the other half cycle by the predetermined first coefficient, (B2) or, an inverted second voltage waveform is generated which corresponds to a value being a result of subtracting a voltage obtained by multiplying the L pole detected voltage in the other half cycle by the predetermined first coefficient from a voltage obtained by multiplying the N pole detected voltage in the other half cycle by the predetermined second coefficient, and (C) in the AC waveform setting step, the AC waveform is set based on the inverted first voltage waveform and the second voltage waveform or based on the first voltage waveform and the inverted second voltage waveform.

* * * * *